(12) United States Patent
Stewart

(10) Patent No.: US 8,804,584 B2
(45) Date of Patent: Aug. 12, 2014

(54) PERIODIC SYNCHRONIZATION LINK QUALITY IN A MESH NETWORK

(75) Inventor: Damon M. Stewart, Provo, UT (US)

(73) Assignee: Digi International Inc., Minnetonka, MN (US)

( * ) Notice: Subject to any disclaimer, the term of this patent is extended or adjusted under 35 U.S.C. 154(b) by 686 days.

(21) Appl. No.: 12/243,698

(22) Filed: Oct. 1, 2008

(65) Prior Publication Data

US 2010/0080157 A1    Apr. 1, 2010

(51) Int. Cl.
  *G08C 17/00*  (2006.01)
  *H04B 7/185*  (2006.01)
  *H04L 12/28*  (2006.01)
  *H04L 12/56*  (2006.01)

(52) U.S. Cl.
  USPC ............................ 370/311; 370/318; 370/400

(58) Field of Classification Search
  USPC .................................. 370/400, 350, 311, 318
  See application file for complete search history.

(56) References Cited

U.S. PATENT DOCUMENTS

| | | | |
|---|---|---|---|
| 7,397,789 B2 * | 7/2008 | Chari et al. | 370/351 |
| 2005/0068970 A1 * | 3/2005 | Srikrishna et al. | 370/400 |
| 2007/0242634 A1 * | 10/2007 | Calcev et al. | 370/318 |
| 2010/0014444 A1 * | 1/2010 | Ghanadan et al. | 370/310 |

* cited by examiner

*Primary Examiner* — Noel Beharry
*Assistant Examiner* — Kodzovi Acolatse
(74) *Attorney, Agent, or Firm* — Fogg & Powers LLC

(57) ABSTRACT

Wireless mesh network nodes in a mesh network are operable to receive a periodic beacon from at least one other mesh network node, where the received beacon comprises received beacon link quality information for the at least one other mesh network node. The nodes are further operable to record the sender identity and link quality of the received periodic beacon, record the received beacon link quality information in the beacon from the wireless mesh network node to the at least one other mesh network node, and retransmit a received periodic beacon to other network nodes, the retransmitted beacon comprising link quality information for beacons received in the wireless mesh network node.

16 Claims, 2 Drawing Sheets

| Device Address | RSSI / Link Quality |
|---|---|
| G | -60 |
| F | -95 |
| I | -78 |
| J | -84 |

PERIODIC SYNCHRONIZATION LINK QUALITY IN A MESH NETWORK

FIELD OF THE INVENTION

The invention relates generally to mesh networks, and more specifically in one embodiment to periodic synchronization link quality in a mesh network.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network.

Mesh networks are typically made up of network nodes that are not mobile, and so link quality and reliability is relatively slow to change. Most applications of mesh networks rely on radio frequency communications to transfer data between network nodes, as running cables between nodes defeats somewhat the intended ease of use of mesh network devices.

The quality of radio frequency or RF links between mesh network devices is affected by a variety of factors, including outside interference such as from other RF devices, and movement of other objects within the mesh network environment. Further, the link quality between two nodes in one direction can be significantly different than the link quality in the other direction, meaning that knowledge of link quality in one direction is not sufficient to fully characterize the ability of two nodes to communicate with one another. Because many mesh network technologies rely both on the ability of a node to send data as well as to receive acknowledgment, bidirectional link quality is important to the reliability of a mesh network.

Some of these problems are compounded in a battery-powered device mesh network environment, where controlling or limiting the rate of battery power consumption is a priority. Radio transmissions particularly consume significant amounts of power, and are desirably kept to a minimum to improve battery life.

There exists a need to provide wireless mesh network technology that addresses factors such as link quality, power consumption, mesh reliability, and other such factors.

SUMMARY

Various example embodiments of the invention comprise wireless mesh network nodes that are operable to receive a periodic beacon from at least one other mesh network node, where the received beacon comprises received beacon link quality information for the at least one other mesh network node. The nodes are further operable to record the sender identity and link quality of the received periodic beacon, record the received beacon link quality information in the beacon from the wireless mesh network node to the at least one other mesh network node, and retransmit a received periodic beacon to other network nodes, the retransmitted beacon comprising link quality information for beacons received in the wireless mesh network node.

DETAILED DESCRIPTION

Figure 1:
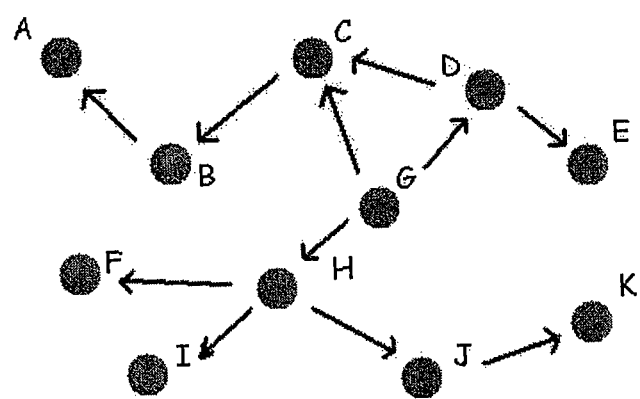
FIG. 1 shows an example radio frequency mesh network, as may be used to practice some embodiments of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Mesh networks are often used to route data between various elements or nodes in a network made up of a number of loosely assembled nodes. Many mesh networks are designed such that a compatible node can easily join the network and receive and send data, including passing received data long a route to an intended destination node. Mesh networks are therefore often self-healing, in that if a node becomes inoperable or loses a connection to another node, data can be easily routed around the broken network link.

Many mesh network technologies use wireless communication, further enhancing the ease of use of mesh networking for certain applications. Because mesh network nodes are typically stationary, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices a practical option. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

But, effective mesh networking in wireless environments such as Zigbee relies on the quality of the radio frequency links between nodes to provide reliable transport of data throughout the network, and to provide a path for reply messages such as acknowledgments to traverse a return path back to the sending nodes. Due to the dynamic nature of radio frequency links, it is often difficult to establish routes that are stable and reliable in both directions.

One example embodiment of the invention address this and other problems by using periodic link status messages or beacon messages that are broadcast from devices in the mesh network to neighbor devices to evaluate and communicate link quality between various nodes. In a more detailed example, a periodic link status message is broadcast from the coordinator node to other nodes that sleep between messages, which wake up to receive and rebroadcast the link status message or beacon until all nodes have broadcast the beacon. The beacon message is serially numbered in some examples so that nodes do not receive and rebroadcast a beacon link status message more than once. When a mesh network node receives a beacon message, it records the link quality, such as by recording the signal strength of the received message and the address or ID of the node that transmitted the message. Further, each beacon message contains within it a list of neighbor addresses and the wireless signal strength of the last beacon messages received from the neighboring nodes.

This enables a network node to determine the signal strength of wireless connections received from the neighboring nodes by recording their addresses and signal strength data upon receiving a beacon message, and further enables the nodes to determine the reverse-channel connection strength back to the neighboring nodes by reading the embedded list of neighbor addresses and wireless signal strength from the beacon messages received from the neighboring nodes. The node can thereby maintain a table of both sending and receiving channel connection quality for each neighboring node, enabling intelligent routing based on bidirectional link quality.

In some environments, some or all of the network nodes are battery powered nodes, and power consumption is a concern. In some such embodiments, the wireless radio is turned off most of the time and powered up only when synchronization beacons or other communications are expected. An inactive network node that is not actively sending or receiving information might elect to power down between synchronization beacons, for example, knowing when the next beacon will be broadcast so that it can power on to receive it and anticipating that the node will not be needed to route data until the next beacon.

FIG. 1 illustrates a mesh network propagating a periodic synchronization beacon message, as may be used to practice an example embodiment of the invention. In this example, nodes A-K are all capable of routing, and node G is the controller node that periodically sends a beacon to other nodes in the mesh network. In this example, only a limited number of adjacent nodes will pick up the beacon transmission from node G, and will retransmit the beacon to other nodes until each node other than the coordinator node G has received and retransmitted the beacon once. Here, node G's beacon message is received in nodes C, D, and H, which retransmit the beacon on to other nodes in the network so that each node receives the beacon. Although node C receives a beacon message from node D in this example, it will not retransmit the beacon from node D if it has already received the same beacon message from node G and retransmitted it. This is controlled in one embodiment by using a beacon number or other identifier for each beacon transmission from the control node G so that nodes can recognize whether they are receiving a new beacon message or an old beacon message that they have already retransmitted.

When a device receives a beacon in this example embodiment of the invention, it rebroadcasts the beacon but still continues to listen for other beacons. Any time a node receives another beacon transmission, it records the sender's address and signal strength or link quality. This information is then used to build a table of the received link quality for neighboring beacons.

Figure 2:
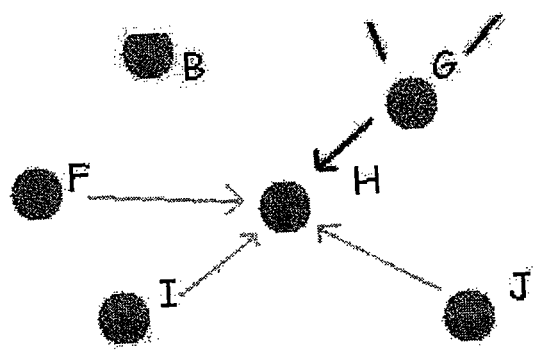
FIG. 2 is a node diagram illustrating receipt of a beacon sent from node G to neighboring nodes and received from the neighboring nodes back in link G, as may be used to practice some embodiments of the invention.

Referring to FIG. 2, node H receives a beacon from coordinating node G and retransmits it to nodes F, I and J. Node H then continues to listen and receives the subsequent beacon retransmissions from nodes F, I, and J, and records the link quality, such as in a table in memory.

Figures 3, 4:
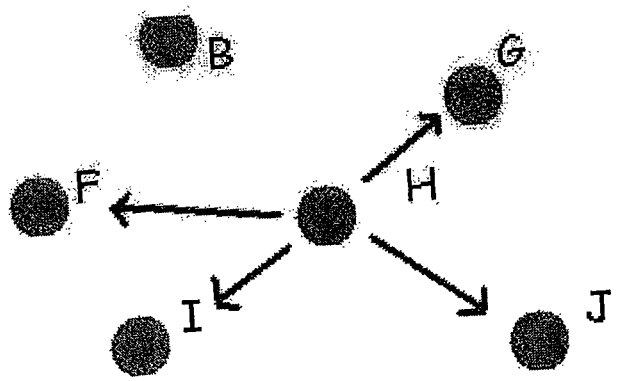
FIG. 3 is a table of neighboring node received radio frequency beacon link quality, as may be used to practice some embodiments of the invention.
FIG. 4 shows how a retransmitted periodic synchronization beacon including received link quality information is received by neighboring nodes, enabling them to determine bidirectional radio frequency link quality, consistent with an example embodiment of the invention.

An example of such a table is shown in FIG. 3, including the link quality of the original beacon received from coordinating node G. Here, nodes F and J are the farthest, and so the signals received form these nodes is somewhat weaker than the signal received from nodes G and I.

Referring to FIG. 4, the received data link quality information stored in node H is included in the forwarded beacon the next time node H receives a new beacon message, such that each of nodes F, G, I, and J receive information regarding their own signals as received in node H. This enables each node to know the quality of its radio frequency signal as it is received in other nodes in addition to the link quality of radio frequency signals received from neighboring nodes. Each node can therefore build a bidirectional link quality table, and determine both whether a message can be reliably sent to another node and whether a message such as an acknowledge message can be reliably received from each neighboring node. Similarly, a node will be able to determine if a neighboring node is not receiving its beacon transmissions, as no link quality information for that connection will be present in a received beacon.

In one embodiment of the invention, link quality information such as is shown in the table of FIG. 3 is included in periodic beacon messages, such as network synchronization beacons. This enables distribution of link quality information between neighboring nodes as is described in FIGS. 2-4 in environments where some or all nodes are operable to sleep between periodic beacons or messages, and to awaken or restore operability at a predetermined time to receive such periodic messages. In another example, periodic beacon messages carry sleep timing information, such as the time to sleep until a next coordinated or predetermined wake time.

In a more detailed example, a synchronization beacon is periodically sent from the coordinating node H, including the time at which the next synchronization beacon will be sent. The synchronization beacon message also includes link quality status information, such as is shown in FIG. 3, so that the beacon message serves both as a periodic synchronization message and as a means of determining and distributing link quality information. Use of beacons or beacon messages to establish bidirectional link quality reduces the number of messages or transmissions that nodes must make, increasing battery life and improving performance of the mesh network. The bidirectional link quality tables maintained in each node can be used to more efficiently route data within the mesh network, and to limit or prevent communication with links where a reliable bidirectional link is not established. In further embodiments, the network nodes are operable to track beacon link quality information over time, and determine the average link quality to another node over a period of time.

Because the example embodiment described here uses beacons that are transmitted at known intervals, the beacon messages can be used to establish bidirectional link quality even in environments in which many or all nodes sleep between beacon messages. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A wireless mesh network node comprising a communications module operable to:
   awaken at a predetermined time during a sleep/wake cycle;
   receive a first beacon from a first mesh network node, wherein first beacon comprises a beacon identifier operable to prevent unintentional retransmission of the same beacon such that a node that has received and retransmitted the beacon will not retransmit the beacon upon receiving the same beacon a second time, the received first beacon comprising received beacon link quality information associated with transfers from the receiving mesh network node to the first mesh network node;
   record the sender identity and link quality of the received first beacon;
   record the received beacon link quality information in the beacon from the wireless mesh network node to the first mesh network node;
   retransmit the received first beacon to other network nodes, the retransmitted beacon comprising link quality information for beacons received in the wireless mesh network node during previous sleep/wake cycles;
   receive an additional beacon within the same sleep/wake cycle;
   determine if the additional beacon received is a retransmission of the first beacon;
   if the additional beacon is a retransmission of the first beacon, determine received data link quality for the additional beacon, store the determined received data link quality and the link quality information received with the additional beacon in a bidirectional link quality table and discard the additional beacon;
   if the additional beacon is not a retransmission of the first beacon, determine received data link quality for the additional beacon, store the determined received data link quality and the link quality information received with the additional beacon in a bidirectional link quality table and retransmit the additional beacon;
   transmit received data link quality information stored in the bidirectional link quality table during retransmission of each beacon;
   sleep until a second predetermined time in a next sleep/wake cycle; and
   determine that a second network node cannot receive data from the network node if link quality information from the network node to the second network node is not received in a beacon at the network node.

2. The wireless mesh network node of claim 1, wherein receiving a first beacon from a first mesh network node comprises receiving a beacon, wherein the beacon includes received data link quality information stored in a bidirectional link quality table in the first mesh network node.

3. The wireless mesh network node of claim 2, wherein the communications module is further operable to use the received data link quality information to determine a bidirectional link quality for a link to another node.

4. The wireless mesh network node of claim 1, wherein the network node is further operable to determine the average link quality to another node over time.

5. The wireless mesh network node of claim 1, wherein the network node comprises a battery-powered device.

6. The wireless mesh network node of claim 1, wherein the network node is further operable to receive the second predetermined time at which it will awaken as a part of a periodic beacon.

7. A method of operating a wireless mesh network node, comprising:
   awakening at a predetermined time during a sleep/wake cycle;
   receiving a first beacon from a first mesh network node, wherein the first beacon comprises a beacon identifier operable to prevent unintentional retransmission of the same beacon such that a node that has received and retransmitted the beacon will not retransmit the beacon upon receiving the same beacon a second time, the received first beacon comprising received beacon link quality information associated with transfers from the receiving mesh network node to the first mesh network node;
   recording the sender identity and link quality of the received first beacon;
   recording the received beacon link quality information in the beacon from the wireless mesh network node to first mesh network node;

retransmitting the received first beacon to other network nodes, the retransmitted beacon comprising link quality information for beacons received in the wireless mesh network node during previous sleep/wake cycles;

receiving an additional beacon within the same sleep/wake cycle;

determining if the additional beacon received is a retransmission of the first beacon;

if the additional beacon is a retransmission of the first beacon, determining received data link quality for the additional beacon, storing the determined received data link quality and the link quality information received with the additional beacon in a bidirectional link quality table and discarding the additional beacon;

if the additional beacon is not a retransmission of the first beacon, determining received data link quality for the additional beacon, storing the determined received data link quality and the link quality information received with the additional beacon in a bidirectional link quality table and retransmitting the additional beacon;

transmitting received data link quality information stored in the bidirectional link quality table during retransmission of each beacon;

sleeping until a second predetermined time in a next sleep/wake cycle; and determining that a second network node cannot receive data from the network node if link quality information from the network node to the second network node is not received in a beacon at the network node.

8. The method of operating a wireless mesh network node of claim 7, wherein receiving a first beacon from a first mesh network node comprises receiving a beacon, wherein the beacon includes received data link quality information stored in a bidirectional link quality data table in the first mesh network node.

9. The method of operating a wireless mesh network node of claim 8, further comprising using the received data link quality information to determine a bidirectional link quality for a link to another node.

10. The method of operating a wireless mesh network node of claim 7, further comprising determining the average link quality to another node over time.

11. The method of operating a wireless mesh network node of claim 7, wherein the network node comprises a battery-powered device.

12. The method of operating a wireless mesh network node of claim 7, further comprising receiving the second predetermined time at which it will awaken as a part of a periodic beacon.

13. A wireless mesh network system comprising a plurality of network nodes that are each operable to:

awaken at a predetermined time in a sleep/wake cycle;

receive a first beacon from a first mesh network node, wherein the first beacon comprises a beacon identifier operable to prevent unintentional retransmission of the same beacon such that a node that has received and retransmitted the beacon will not retransmit the beacon upon receiving the same beacon a second time, the received first beacon comprising received beacon link quality information associated with transfers from the receiving mesh network node to the first mesh network node;

record the sender identity and link quality of the received first beacon;

record the received beacon link quality information in the beacon from the wireless mesh network node to the first mesh network node;

retransmit the received first beacon to other network nodes, the retransmitted beacon comprising link quality information for beacons received in the wireless mesh network node during previous sleep/wake cycles;

receive an additional beacon within the same sleep/wake cycle;

determine if the additional beacon received is a retransmission of the first beacon;

if the additional beacon is a retransmission of the first beacon, determine received data link quality for the additional beacon, store the determined received data link quality and the link quality information received with the additional beacon in a bidirectional link quality table and discard the additional beacon;

if the additional beacon is not a retransmission of the first beacon, determine received data link quality for the additional beacon, store the determined received data link quality and the link quality information received with the additional beacon in a bidirectional link quality table and retransmit the additional beacon;

transmit received data link quality information stored in the bidirectional link quality table during retransmission of each beacon;

sleep until a second predetermined time in a next sleep/wake cycle; and determine that a second mesh network node cannot receive data from the receiving mesh network node if link quality information from the receiving mesh network node to the second mesh network node is not received in a beacon at the receiving mesh network node.

14. The wireless mesh network system of claim 13, wherein receiving a first beacon from a first mesh network node comprises receiving a beacon, wherein the beacon includes received data link quality information stored in a bidirectional link quality table in the first mesh network node.

15. The wireless mesh network system of claim 14, wherein the plurality of network nodes are each further operable to use the received data link quality information to determine a bidirectional link quality for a link to another node.

16. In a wireless mesh network system having a plurality of network nodes, including first and second network nodes, wherein the network nodes are awake during awake intervals, a method of determining link quality between network nodes, comprising:

transmitting a first beacon from the first network node to the second network node, wherein the beacon includes link quality information associated with one or more network nodes from whom the first network node received a beacon during a previous awake interval;

receiving the first beacon at the second node;

determining, at the second node, link quality information associated with transfers from the first node to the second node;

recording the link quality information associated with transfers from the first node to the second node;

recording the link quality information received with the first beacon as first node link information, wherein the first node link information includes the link quality information associated with transmissions from the second node to the first node;

transmitting a retransmitted beacon from the second network node, wherein the retransmitted beacon includes link quality information associated with beacons received from one or more network nodes from whom the second network node received a beacon during a previous awake interval; and determining that another network node cannot receive data from the second network node if link quality information from the second network node to the other network node is not received in a beacon at the second network node.

\* \* \* \* \*